United States Patent [19]
Wardell

[11] Patent Number: 5,338,084
[45] Date of Patent: Aug. 16, 1994

[54] COVER SYSTEM FOR FLATBED TRAILERS AND KIT THEREFOR

[75] Inventor: James R. Wardell, Strasburg, Ohio
[73] Assignee: Roll-A-Cover Inc., Strasburg, Ohio
[21] Appl. No.: 991,117
[22] Filed: Dec. 16, 1992
[51] Int. Cl.⁵ .................................................. B62D 25/06
[52] U.S. Cl. ........................... 296/105; 296/100; 296/43
[58] Field of Search .............. 296/105, 104, 100, 101, 296/43; 135/88

[56] References Cited

U.S. PATENT DOCUMENTS

| | | | |
|---|---|---|---|
| 1,627,716 | 5/1927 | Teachout . | |
| 3,481,645 | 12/1969 | Stepp | 296/105 |
| 3,688,787 | 9/1972 | Feather | 135/7.1 A |
| 4,285,539 | 8/1981 | Cole | 296/105 |
| 4,289,346 | 9/1981 | Bourgeois | 296/105 |
| 4,342,480 | 8/1982 | Ross, Jr. | 296/105 X |
| 4,711,484 | 12/1987 | Tuerk | 296/105 |
| 4,756,325 | 7/1988 | Daniels | 135/88 |
| 4,902,064 | 2/1990 | Tuerk et al. | 296/105 |
| 4,938,523 | 7/1990 | Camp | 296/105 X |
| 5,080,422 | 1/1992 | DeMonte et al. | 296/105 |

*Primary Examiner*—Joseph D. Pape
*Attorney, Agent, or Firm*—Donald A. Bergquist

[57] ABSTRACT

A collapsible cover system and kit therefor are removably mounted to a plurality of spaced stake sockets secured between longitudinally extending rub rails and opposite sides of a flatbed vehicle. Stakes, disposed in the stake sockets, are slidingly connected to two lengths of spaced guide tracks that project above and extend along the sides of the flatbed vehicle. Inverted bow-shaped members having free ends are removably secured to carrier means that slidingly connect the bow-shaped members to the guide.

22 Claims, 7 Drawing Sheets

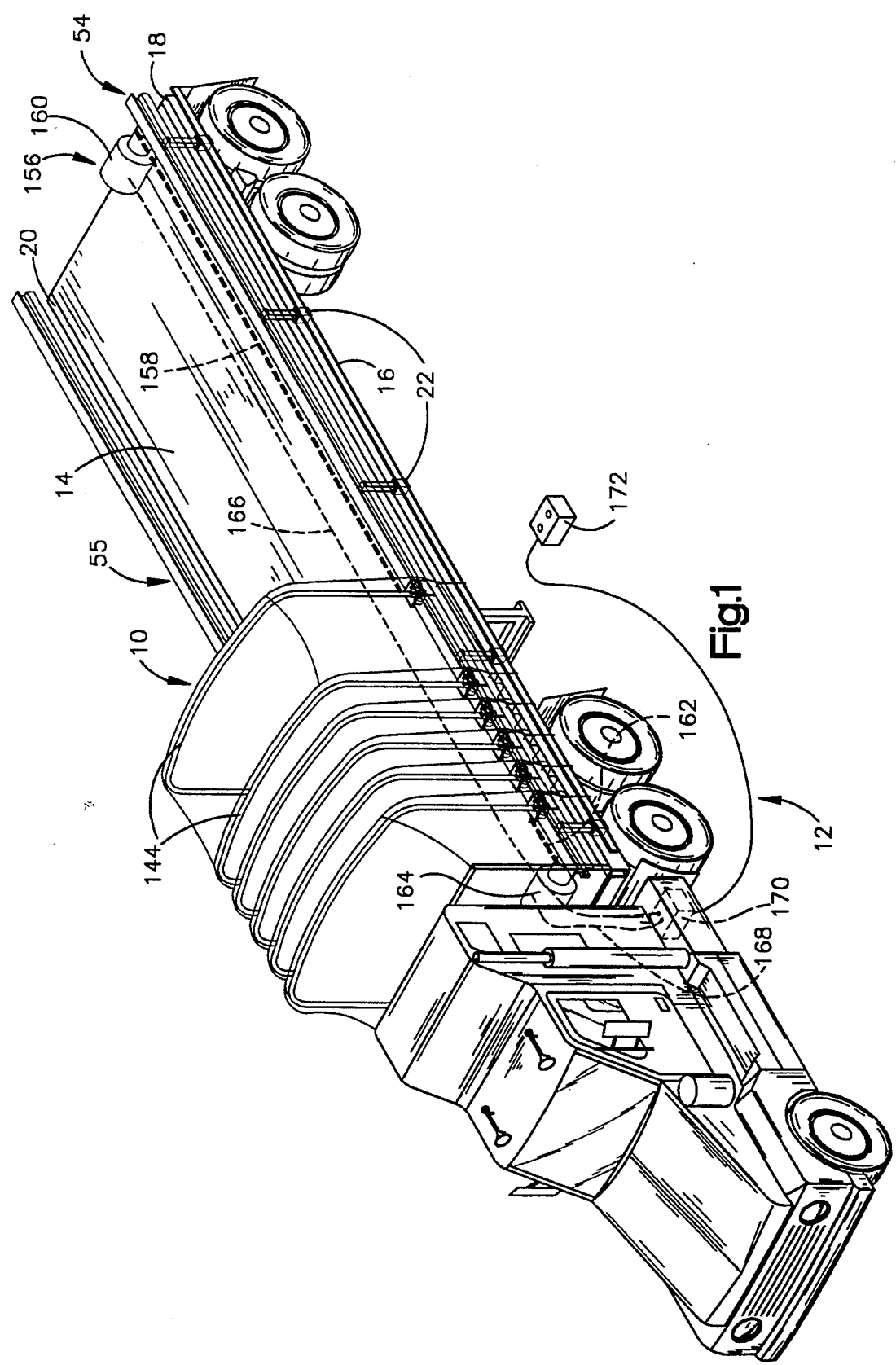

COVER SYSTEM FOR FLATBED TRAILERS AND KIT THEREFOR

FIELD OF THE INVENTION

This invention relates to the field of flexible cover systems for flatbed trailers. More particularly, the invention relates to a flexible cover system and kit therefor that can be quickly and easily retrofitted to a conventional flatbed trailer.

BACKGROUND OF THE INVENTION

Flexible cover systems for conventional flatbed trailers typically use inverted U-shaped bow members that are longitudinally displacable between extended and collapsed conditions to operate a flexible cover member, such as a tarp, between covered and uncovered conditions relative to the space above the flatbed, as discussed in U.S. Pat. No. 4,711,484.

One problem with the known cover systems is that they are permanently installed to flatbed trailers and are not constructed to be retrofitted to existing flatbed trailers without substantial modification to these trailers. Besides the time consuming and expensive labor costs associated with installing the prior art cover systems, it is also expensive to remove these systems.

OBJECTS AND SUMMARY OF THE INVENTION

It is an object of the present invention to provide a flexible cover system and kit therefor that can be quickly and easily secured to a conventional flatbed trailer to obviate the problems and limitations of the prior art systems.

It is a further object of the present invention to provide a cover system and kit therefor that can be quickly and easily retrofitted to a conventional flatbed trailer.

Yet another object is to provide a flexible cover system and kit therefor that can be quickly and easily removed from a conventional flatbed trailer to which it was previously installed.

Still another object of the present invention to provide a flexible cover system and kit therefor that can be retrofitted to a conventional flatbed trailer SO as not to extend beyond the existing width of the trailer.

In accordance with the invention, there is provided a collapsible cover system and kit therefor adapted in use to be removably mounted to a plurality of spaced stake sockets secured between longitudinally extending rub rails and opposite sides of a flatbed vehicle. The system and kit comprise a plurality of stakes having a lower end adapted in use to be securely disposed in the stake sockets and an upper end adapted in use to project upward from the flatbed vehicle. A plurality of longitudinal rails are adapted in use to fit together in end to end registering relationship and form two lengths of spaced guide tracks that project above and extend along the sides of the flatbed vehicle. Each of the rails is adapted in use to be attached to the upper end of one of the stake members for longitudinal sliding movement of the rail with respect to the stake without vertical disengagement of the rail from the stake. A plurality of inverted bow-shaped members having free ends are adapted in use to be removably secured to the guide tracks. A plurality of carrier means are adapted in use to slidingly connect the free ends of the bow-shaped members to an associated guide track.

Also in accordance with the invention, each stake member has a T-shaped stake member projecting outward from the upper end and each of the rails has a bottom section with a T-shaped slot formed therein that extends the length of the rails and which slot is adapted in use to receive the T-shaped stake member and enable longitudinal sliding movement of the rail with respect to the stake while preventing vertical disengagement of the rail from the stake.

Further in accordance with the invention, a flexible cover member is adapted in use to be supported by the bow-shaped members to enclose a portion of the flatbed vehicle when the bow-shaped members are in an expanded condition. The bow-shaped members are U-shaped and have a first generally horizontal portion adapted in use to extend transversely in spaced relation above the flatbed vehicle. Also, the bow-shaped members have a pair of downwardly extending vertical leg portions with free ends adapted in use to be secured to the guide tracks.

According to the invention, each of the longitudinal rails has an interlock means at either end adapted in use to couple with the interlock means of an adjacent rail, The interlock means comprises a V-shaped groove at one end of the rail and a wedge-shaped projection at the opposing end of the rail whereby the wedge-shaped projection is adapted in use to be demountably coupled with the V-shaped groove to secure adjacent rails to each other. In another embodiment; the interlock means comprise at least one rectangular-shaped groove at one and of the rail and at least one rectangular-shaped projection at the opposing end of the rail whereby the rectangular-shaped projection is adapted in use to be demountably coupled with the rectangular-shaped groove to secure adjacent rails to each other. In addition, the interlock means includes lock means at either end of the rails adapted in use to secure adjacent coupled rails to each other.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1 is a side perspective view of a flexible cover system, in accordance with the invention, used in connection with a flatbed trailer vehicle, the bow-shaped members that support the flexible cover being shown in a partially expanded condition;

DETAILED DESCRIPTION OF THE INVENTION

Figure 1A:
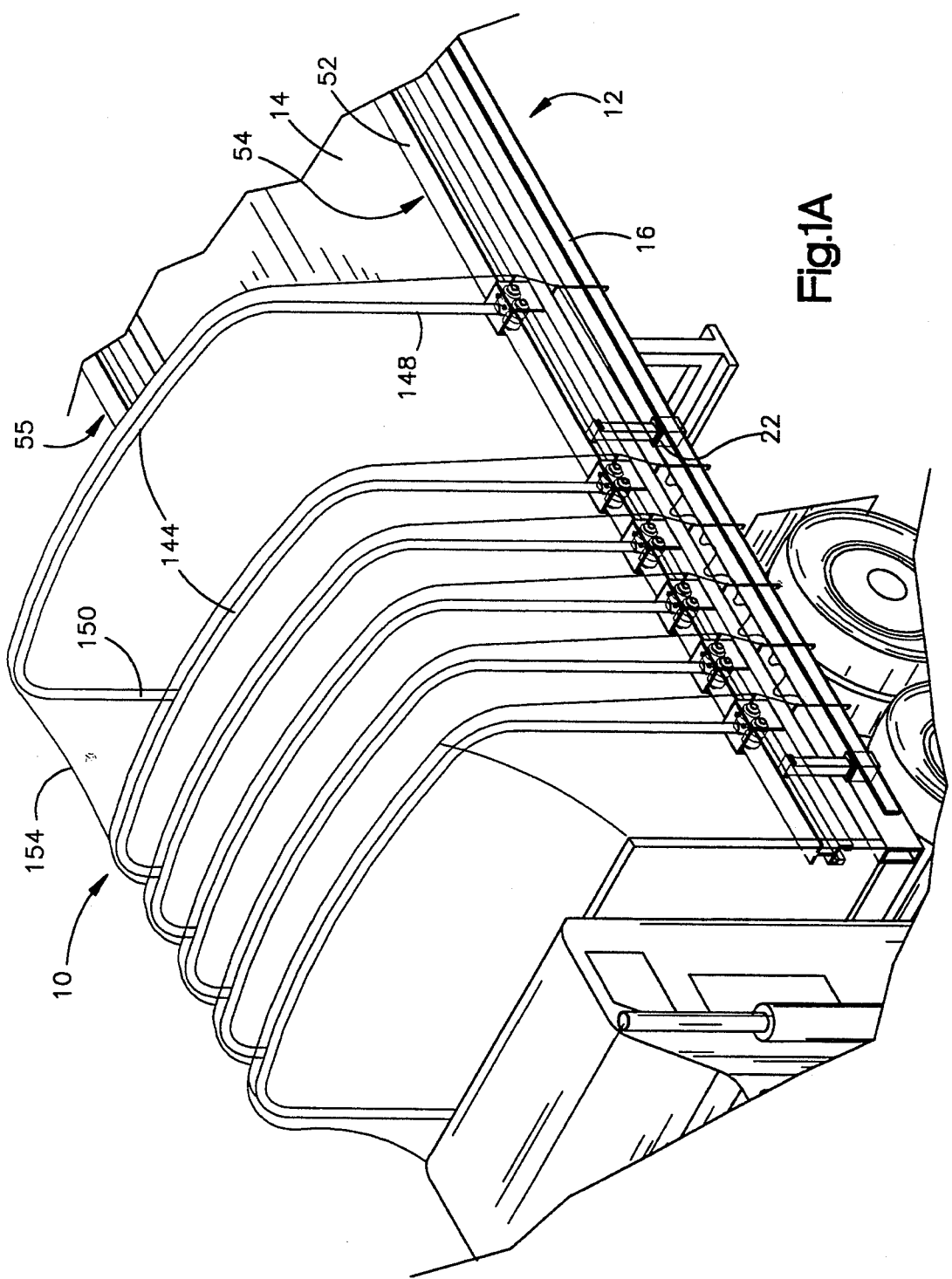
FIG. 1A is an enlarged, partial side perspective view of the flexible cover system illustrated in FIG. 1.

Referring to FIGS. 1 and 1A, there is illustrated a novel flexible cover system 10 in connection with a conventional flatbed trailer vehicle 12. The conventional flatbed vehicle 12, as seen in the enlarged view of FIG. 1A, has a flatbed body 14 with longitudinally extending rub rails 16 projecting outwardly from and extending substantially the length of opposite sides 18, 20 of the flatbed body 14. The rub rails 16 prevent damage to the sides of flatbed body 14 from accidents, such as rubbing against the sides of a loading dock. A plurality of spaced stake sockets 22 are located between the longitudinally extending rub rails 16 and the opposite sides 18, 20 of the flatbed body 14 and permanently secure the rails 16 to the opposite sides by means such as welding. Normally, the spacing between adjacent sockets is 4 feet; in practice, however, the spacing between the sockets can vary by several inches from the normal spacing. This variation in spacing must be taken into consideration so that the disclosed invention can be retrofitted onto existing flatbed trailers. The stake sockets 22 are typically used to hold stakes for securing a load carried on the flatbed body 14.

Figure 2:
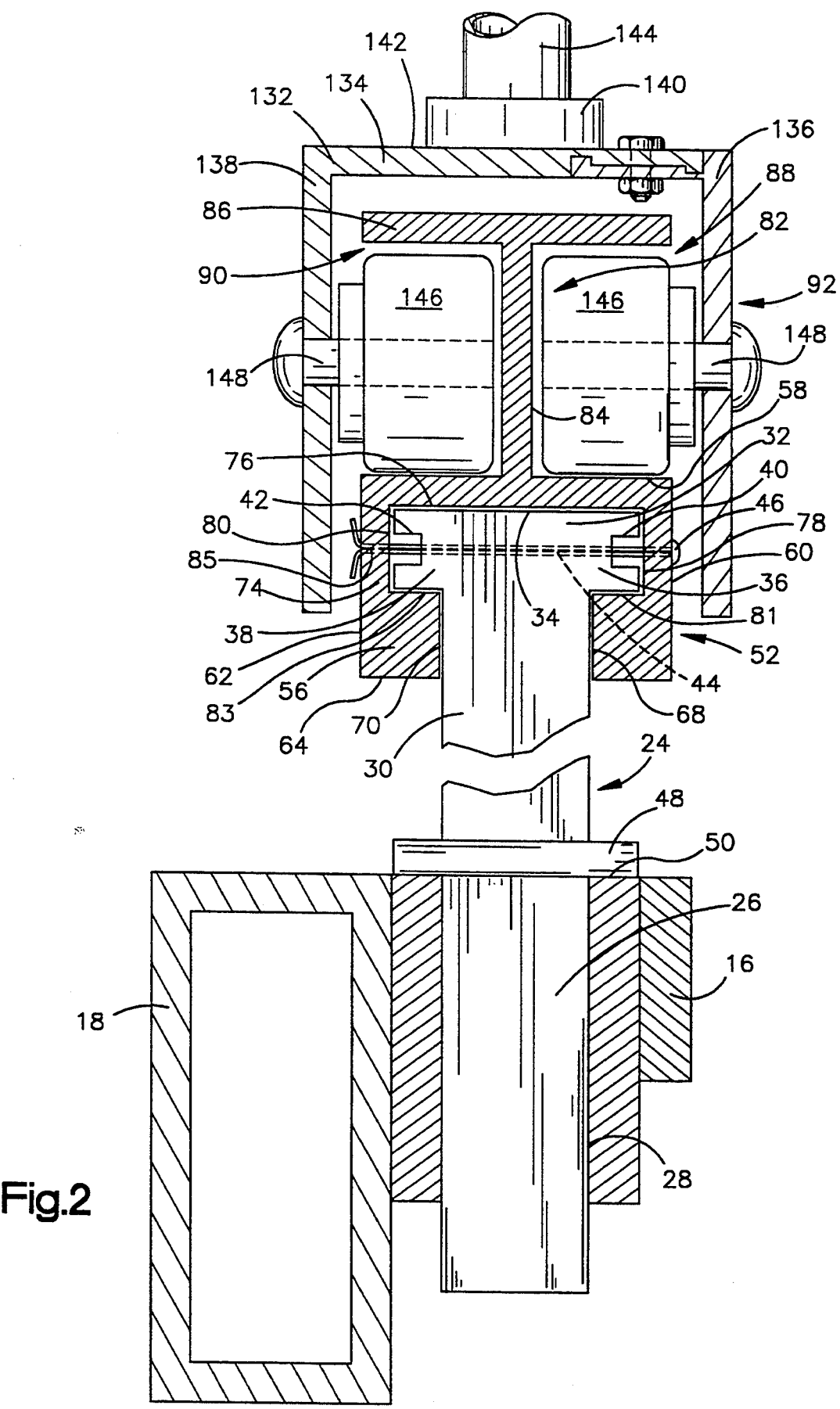
FIG. 2 is a cross-sectional view illustrating a support structure for attaching a bow-shaped member to the flatbed trailer vehicle of FIG. 1.
Figure 4:
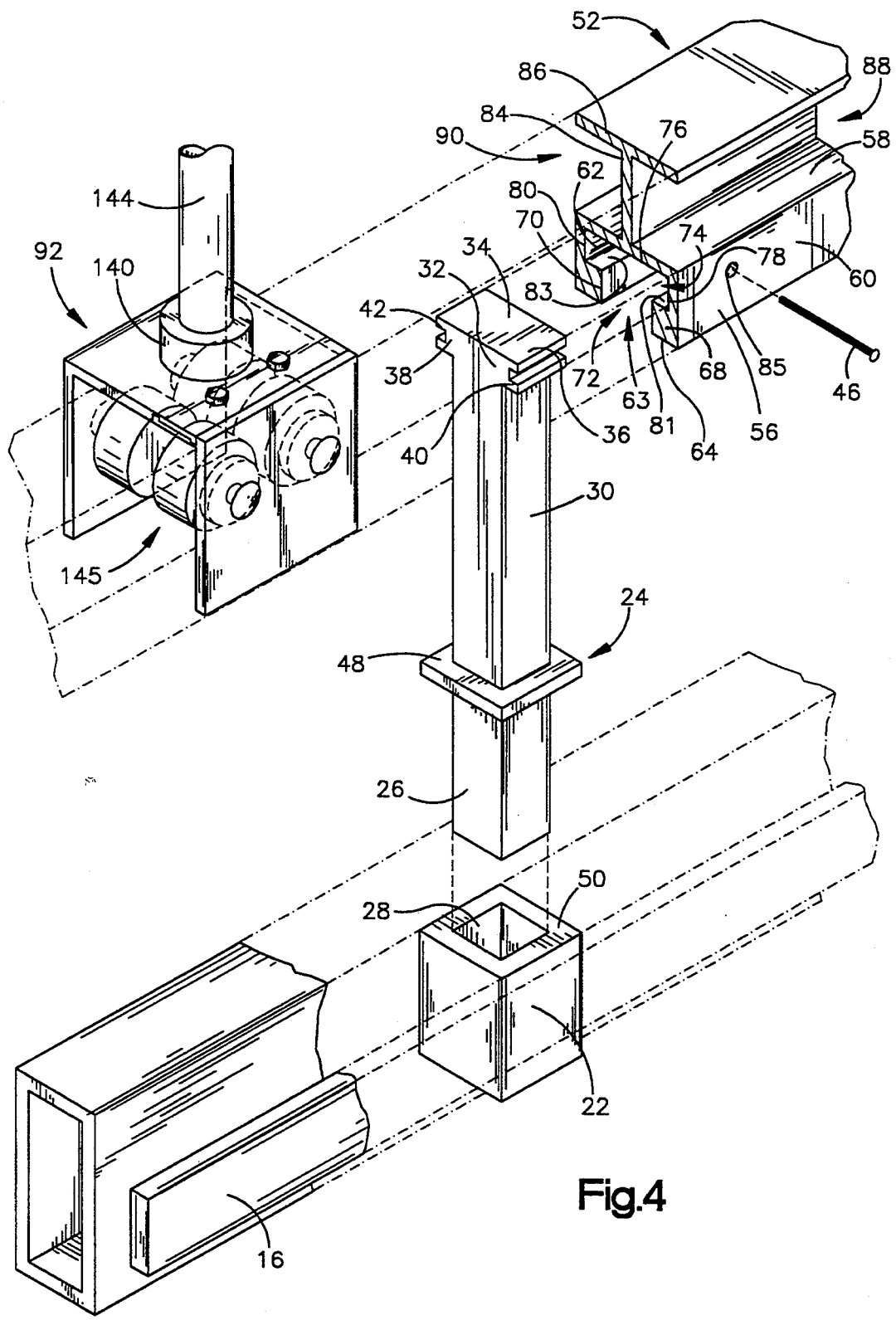
FIG. 4 is an exploded perspective view of the support structure for attaching a bow-shaped member of a cover system to the socket disposed between the rub rail and side of the flatbed of the trailer vehicle of FIG. 1.

The flexible cover system 10 includes a plurality of stakes 24 having a lower end section 26 adapted in use to be securely disposed in the rectangular or square throughbore 28 of sockets 22, as illustrated in FIGS. 2 and 4. The stakes 24 have an upper end section 30 with an interlocking stake head 32 at the free end. Head 32 has a flat upper surface 34 and shoulders 36 and 38 extending outward to opposite sides of stake 24. A throughbore 44, disposed substantially in the center of stake head 32, is provided to receive a locking pin 46, as discussed in more detail hereinafter. Stakes 24 also have a collar 48, located between the upper and lower end sections 30 and 26, to seat on the upper end face 50 of socket 22 and secure the stake within the socket by means of gravity. Grooves 40 and 42, generally rectangular, are provided in shoulders 36 and 38, respectively, and extend the width of head 32 to serve as drill guides for drilling said throughbore 44. In practice, the stake head 32, the upper portion 30 of the stake 24, and the collar 48 may be of a single extrusion that is permanently attached to the lower portion 26 of the stake 24.

A plurality of longitudinal rails 52 are adapted in use to fit together in end to end registering relationship to form two lengths of spaced guide tracks 54 and 55 that project above and extend along the sides of the flatbed body 14. The distance between the guide tracks 54, 55 and the top surface of the flatbed body 14 is established by the length of the upper end sections 30 of stakes 24; this length may even be zero. Each rail 52 is about four or eight feet in length.

Each rail 52 is preferably formed of a one-piece metal extrusion. The rails 52 have a generally rectangular bottom section 56 with a top wall 58, side walls 60 and 62 and a bottom surface 64. A T-shaped slot 63 is formed in the bottom section 56 and extends the full length of each rail. T-shaped slot 63 has the side walls 68 and 70 forming the narrower leg portion 72 opening at the bottom surface 64 of each rail 52. The wider head portion 74 of slot 63 has a flat bottom surface 76 adapted to slide on the upper surface 34 of stake 24, as further discussed below, side walls 78 and 80 that are spaced from each other at least a distance greater than the width of head 32, and upper surfaces 81 and 83 that are substantially parallel to bottom surface 76. Preferably, the distance between upper surfaces 81 and 83 and bottom surface 76 is enough to enable one rail to be removed without removing an adjacent rail, as discussed in more detail below. Bores 85 extend into head portion 74 of T-shaped slot 63 through side walls 60 and 62 and receive the locking pin 46, as discussed below.

The rails 52 also have a T-shaped upper section 82 extending upward from top wall 58. Upper section 82 includes an upright support wall 84 secured at one end to the top wall 58 equidistant from side walls 60 and 62 and extending the length of the rail. The upper section 82 also has top wall 86 disposed parallel to wall 58 and secured to the other end of support wall 84. Oppositely facing U-shaped sections 88 and 90, formed between the top wall 58 and the top wall 86, interconnect with a carrier means 92, as discussed in detail below.

Figure 5:
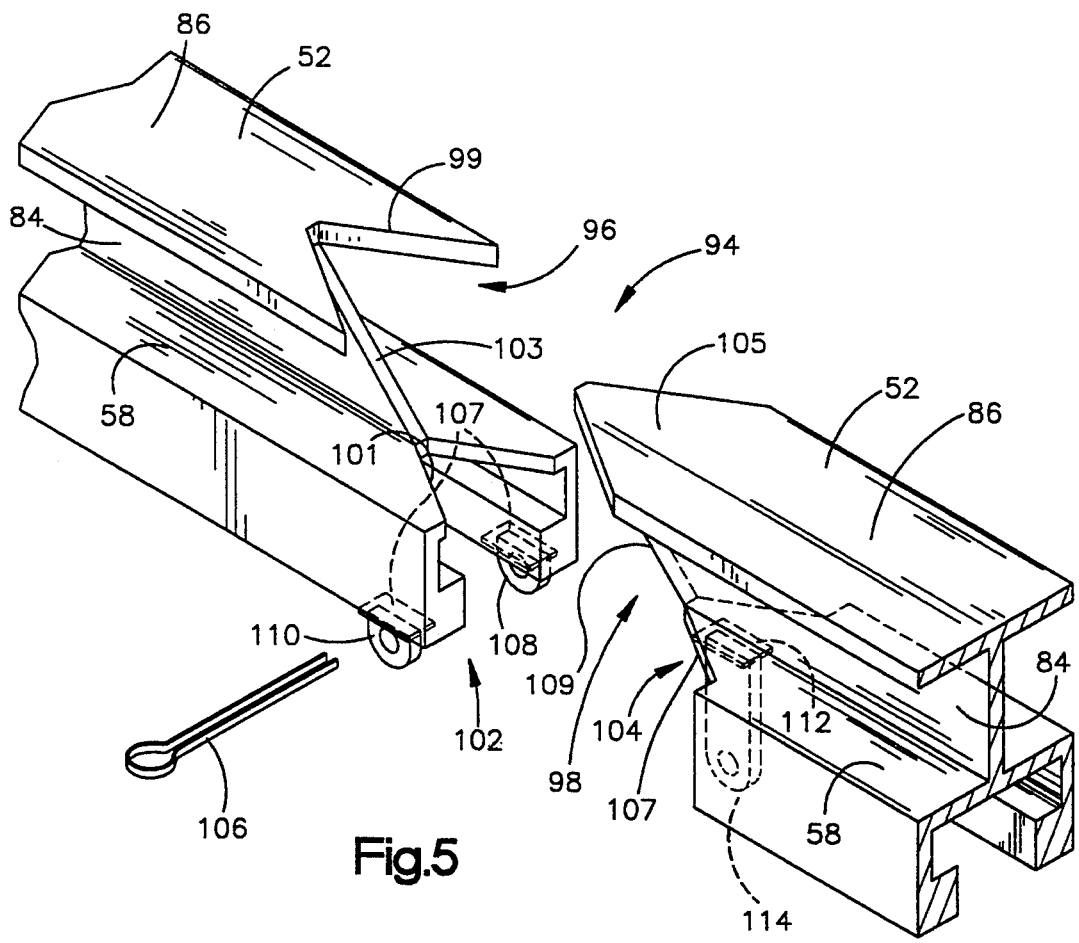
FIG. 5 is a perspective, exploded view illustrating the preferred embodiment of the interlocking structure between longitudinal rails.
Figure 6:
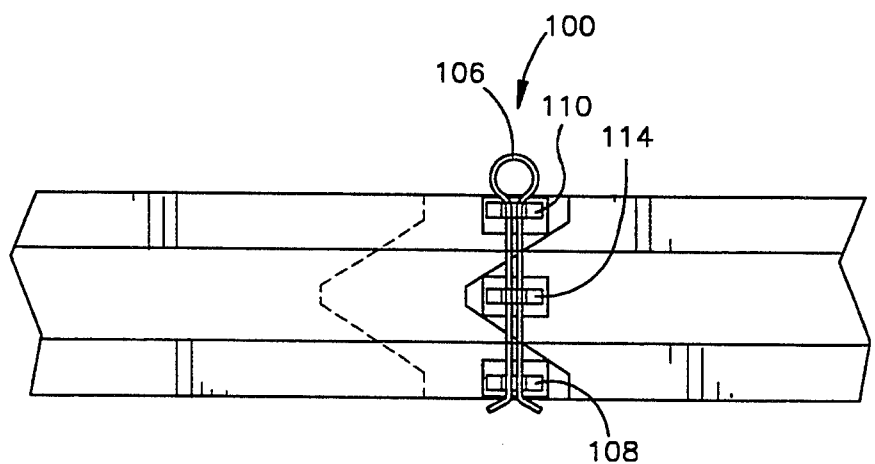
FIG. 6 is a bottom view through line 6—6 of FIG. 7 illustrating interlocked adjacent rails.
Figure 7:
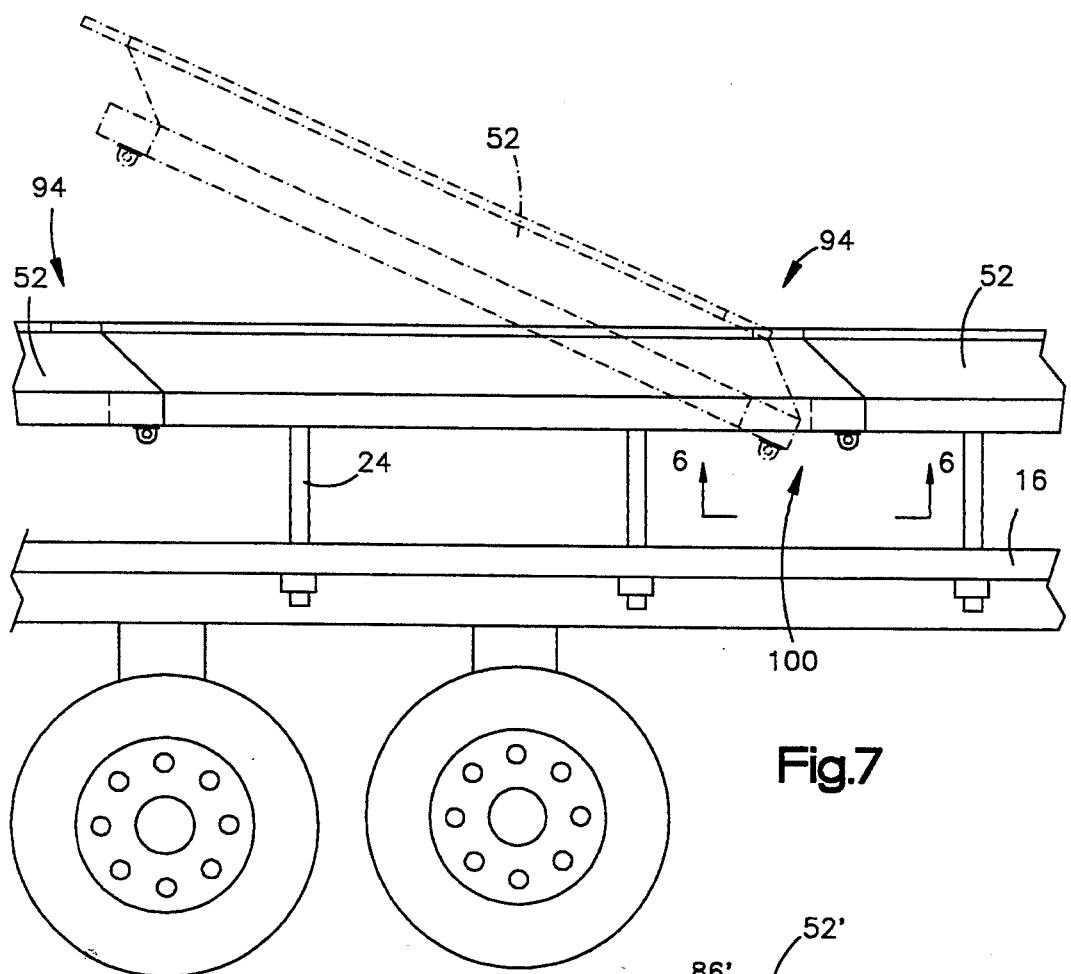
FIG. 7 is a side view of a section of the trailer vehicle illustrating the preferred embodiment of interconnected longitudinal rails with a rail being removed illustrated in phantom.

Referring to FIGS. 5, 6, and 7, there is shown a preferred embodiment of an interlock means 94 at either end of each longitudinal rail 52 that is adapted in use to mate with the interlock means of an adjacent rail. The interlock means 94 comprises a V-shaped groove 96 at one end of rail 52 and a wedge-shaped projection 98 at the opposing end of rail 52. The V-shaped groove is offset so that the groove 99 cut in the upper wall 86 of rail 52 is set further back towards the opposite end of the rail than the groove 101 cut in the top wall 58 of the rail. The support wall 84 forms a straight inclined surface 103 extending between the apexes of grooves 99 and 101. The wedge-shaped projection 98 is offset so that the projection 105 extending outward from the upper wall 86 of rail 52 extends further towards the opposite end of the rail than the projection 107 extending outward from the top wall 58 of the rail. The support wall 84 forms a straight inclined surface 109 extending between the tips of projections 105 and 107. The projection 98 mates in the groove 96 so that adjacent rails can be demountably interlocked to secure the adjacent rails to each other.

The interlock means 94 also includes lock means 100 to demountably lock adjacent rails to each other. Lock means 100 can be a hinge type latch comprising two interlocked sections 102 and 104 that are secured together with a pin 106. Section 102 includes at least two spaced projections 102 and 110 with bores therethrough. The projections 108 and 110 are disposed on either side of groove 101 and project downward from the bottom surface 64. Section 104 includes at least one projection 114 with a bore therethrough. Projection 114 is disposed in the center of projection 107 so as to mesh between projections 108 and 110 with all three bores aligned when the ends of adjacent rails are interlocked with each other. A pin 106 is then driven into the aligned bores to secure the rails together. It can easily be seen that if the projections 108, 110, and 114 are of sufficiently low profile to permit passage of carrier means 92, described hereinafter, then they may be mounted atop upper wall 86 in a manner analogous to that described immediately above.

Figure 8:
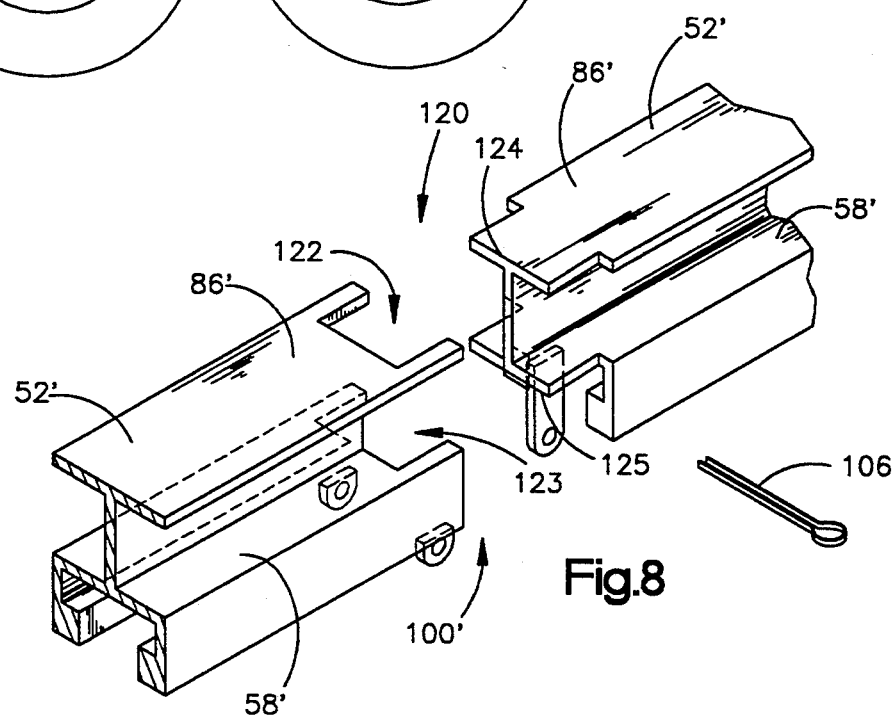
FIG. 8 is a perspective, exploded view illustrating an alternative embodiment of the interlocking structure between longitudinal rails.

While the preferred embodiment of the interlock means 94 is illustrated in FIGS. 5–7 and discussed above, it is also within the scope of the present invention to provide a second embodiment of interlock means 120 as illustrated in FIG. 8. The interlock means 120 comprises upper and lower rectangular-shaped slots 122 and 123 at one end of the rail 52' and rectangular-shaped projections 124 and 125 at the opposing end of the rail. Throughout the specification, primed numbers represent structural elements that are substantially identical to structural elements represented by the same unprimed number. The rectangular-shaped slots are disposed in the upper wall 86' and in the top wall 58' of the rail 52'. The rectangular-shaped projections 124 and 125 extend outward from the upper wall 86' and the top wall 58' of the opposite end of rail 52' from the rectangular-shaped slots. The projections 124 and 125 are disposed to mate with the rectangular-shaped slots 122 and 123, respectively, when adjacent rails are demountably interlocked to secure the adjacent rails to each other. Further, lock means 100', as discussed in detail above, can be incorporated to demountably lock adjacent rails to each other.

Referring to FIGS. 2 and 4, there is illustrated a carrier means 92 adapted for sliding movement relative to an associated guide track 54 or 55. Carrier means 92 includes a U-shaped carrier body 132 including a base plate 134 and downwardly-projecting side plates 136 and 138 extending downward from opposite ends of base plate 134. A cylindrical sleeve 140, secured to the outer facing surface 142 of base plate 134, is provided to receive the end of a bow-shaped member 144, as described in more detail below. In the preferred embodiment, roller means 145, such as guide wheels 146, preferably disposed in tandem, are attached by rivets 148, to opposite side plates 136 and 138. When the carrier means 92 is assembled on a rail 52, the guide wheels 146 roll along the top wall 58 of rail 52. While the carrier means 92 can be installed by sliding it onto either end of a track, it is also within the terms of the invention to provide a side plate 136 detachably connected to base plate 134, by means such as interlocking sections bolted together, as illustrated in FIG. 2. Then, one side plate of the carrier can be positioned on the track and the other can next be installed and secured to base plate 134 with means such as a nut and bolt.

Figure 3:
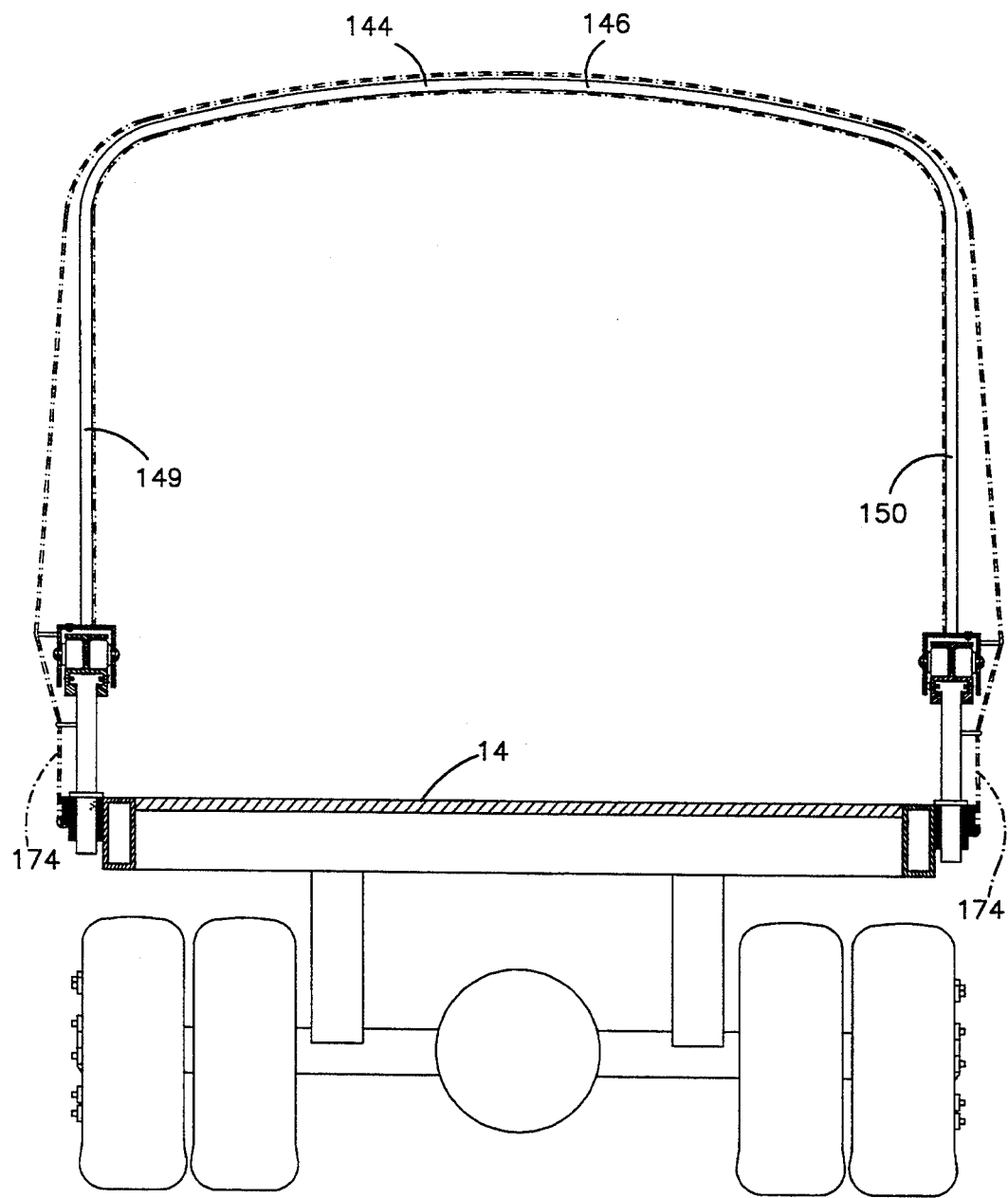
FIG. 3 is a rear end view, partially in cross-section, of the flatbed tailer vehicle with the cover system illustrated in FIG. 1.

A plurality of inverted U-shaped bow members 144 are adapted in use to extend transversely in spaced relation above the flatbed body 14, as shown in FIGS. 1, 1A, and 3. The bow-shaped members 144 each have a first generally horizontal portion 146 and a pair of downwardly-depending vertical leg portions 149 and 150. The lower ends of the leg portions 149 and 150 have a slip fit connection within the sleeves 140, and when assembled, are secured in cylindrical sleeves 140 projecting upward from carrier means 92. Carrier means 92, in turn, are movably secured to guide tracks 54 and 55 to enable rolling movement relative to an associated guide track so that the bow-shaped members can be easily moved between a collapsed condition and an expanded condition. The bow-shaped members in the collapsed condition may be selectably positioned at any location along the length of the guide tracks.

The bow-shaped members 144 are secured to a sheet-like, flexible cover member 154 adapted in use to be supported by the bow-shaped members to enclose a portion of the space above the flatbed vehicle when the bow-shaped members are in an expanded condition and in tightly compacted relation when in the completely collapsed condition. The cover member 154 can be a tarp constructed of any conventional material such as a canvas, plastic or other suitable material. The tarp can include a plurality of support tubes or pockets that receive bow-shaped members 144 in the manner illustrated in FIG. 6 and column 6, lines 23–40 of the U.S. Pat. No. 4,289,346 to Bourgeois, which is expressly incorporated herein by reference. The cover can have a wide band of web belting that runs along the bottom edges for the length of the cover. When the cover is drawn tight by extending the cover for the full length of the trailer, it is held snugly to the rub rail. An important aspect of the invention is that the cover system remains substantially within the confines of the trailer to which the cover system is being fitted or retrofitted. This is important because government regulations restrict the maximum trailer width dimensions. Since trailers are typically manufactured to the maximum allowable width, the present invention cannot overhang beyond the rub rail because that would result in an oversized trailer as per government rules.

In order to displace the bow-shaped members 144 between their expanded and collapsed positions, a power drive means 156, as schematically illustrated in FIG. 1, is provided. The rearward-most carrier means is connected to both ends of a cable 158 that in turn is wrapped about a rotary drum driven by a motor 160 located at the rear end of the trailer and about a pulley located at the front end of the trailer. The forward-most carrier is also connected to both ends of a cable 162 that in turn is wrapped about a rotary drum driven by a motor 164 located at the front end of the trailer and about a pulley located at the rear end of the trailer. The power to the motors comes from power cords 166 and 168 that plug into an electrical receptacle 170 within the cab. Similar power drive means may be positioned on either side of the trailer bed to balance forces on the carrier means, A control box 172 can independently operate each motor, Each of the drums is independently driven by its associated motor in the forward or reverse direction. When the rear motor 160 is operated, the rearmost carrier means can be moved closer to or farther from the back end of the trailer. In a similar manner, when the front motor 164 is operated, the frontmost carrier means can be moved closer to or farther from the front end of the trailer.

To assemble the flexible cover system 10 on a conventional flatbed trailer vehicle 12, stakes 24 are first inserted in the sockets 22. Next, the rails are slid into place so that the interlocking heads 32 of the stakes are received within the T-shaped slots 63 in the bottom section 56 of each rail. The distance of the slot between surface 76 and surfaces 81 and 83 is large enough so that the free end of a rail can be raised above the top of an adjacent stake while the rail is in place on the interlocking head of a stake. This is illustrated in FIG. 7 where an intermediate rail is removed without removing the rails on either side. Note that the offset relationship of the projections 98 and the grooves 96 enable the rails to be assembled and disassembled without moving the adjacent rails. Thus, the rails can be assembled without having to start at the rear of the flatbed vehicle and to keep the rail parallel to the surface of the flatbed vehicle while sliding it into position.

As the rails are put into place, the interlock means 94 are aligned and the rails are joined to form the two parallel guide tracks 54 and 55. Then the interlocked, adjacent rails can be fixed to each other with the pin 106 of lock means 100. The frontmost rail butts against the bulkhead of the flatbed trailer. If desired, the frontmost rail can be pinned in place with a horizontal locking pin 46 through it and the interlocking head 32 of the frontmost stake on which it is assembled. Further, the frontmost rail can also be pinned to the bulkhead if desired. When the rails are completely in place, the rearmost rail can be pinned in place with a horizontal locking pin 46 through it and the interlocking head 32 of the rearmost stake on which it is assembled.

Next, the carrier means 92 are assembled on the guide tracks and attached to the power drive system 156. Continuing, the bow-shaped members 144, after being installed in the cover member 154 are slipped into the sleeves 140 of the carrier device. The bottom of the cover member 154 can be connected by elastic means 174, such as flexible cords, to the rub rail after the bow-shaped members are in a desired position. The cover can be opened or closed by the power system 156 and positioned anywhere along the length of the trailer.

When it is desired to load or unload the trailer from the side, one of the rails may need to be removed so that a forklift truck or other such device can unload from the side. Under these circumstances, the rearmost rail is first unpinned. Then the rail to be removed is unpinned from the rails adjacent to it and from the stake to which it is locked, if necessary. Then the rail is moved towards the rear of the trailer until its front end is uncoupled from the rear end of the forward adjacent rail. Finally, the foremost end of the rail to be removed is lifted clear of any interfering stake and slid forward out of coupled engagement with the adjacent rearmost rail. In an embodiment wherein projections 114 within slot 63 may obstruct the sliding decoupling of the rail from an associated stake 24, the stake may be removed from the stake pocket 28 while still coupled to the rail element being removed.

While the individual parts of the invention have been described separately and in the manner in which they are assembled on a trailer bed vehicle, it is understood that the individual parts can be sold as a kit that can be conveniently retrofitted on a flatbed trailer vehicle. That is, each individual part is adapted in use to be assembled with other individual parts and/or with the trailer bed vehicle.

It is apparent that there has been provided in accordance with this invention a cover system for flatbed trailers and kit therefor that satisfy the objects, means and advantages set forth hereinbefore. According to the invention, the cover system can be easily, quickly, and relatively inexpensively retrofitted onto an existing flatbed trailer without any significant modifications to the trailer. A single rail can be removed with removing the remainder of the rails so that the truck can be conveniently loaded or unloaded.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. A collapsible cover kit adapted in use to be removably mounted to a plurality of spaced stake sockets secured between longitudinally extending rub rails and opposite sides of a flatbed vehicle, said kit comprising:

a plurality of stakes having a lower end adapted in use to be securely disposed in said stake sockets and an upper end adapted in use to project upward from said flatbed vehicle;

a plurality of longitudinal rails adapted in use to fit together in end to end registering relationship, thereby to form two lengths of spaced guide tracks that project above and extend along the sides of said flatbed vehicle, each of said rails being adapted in use to be attached to said upper end of one of said stake members for longitudinal sliding movement of said rail with respect to said stake without vertical disengagement of said rail from said stake;

a plurality of inverted bow-shaped members having free ends adapted in use to be removably secured to said guide tracks; and a plurality of carrier means adapted in use to slidingly connect each free end of said bow-shaped members to an associated guide track.

2. The collapsible cover kit of claim 1 wherein said stakes each have a T-shaped stake member projecting outward from said upper end and each of said rails has a bottom section with a T-shaped slot formed therein that extends the length of said rails and which slot is adapted in use to receive said T-shaped stake member and enable longitudinal sliding movement of said rail with respect to said stake while preventing vertical disengagement of said rail from said stake.

3. The collapsible cover kit of claim 1 further including a flexible cover member adapted in use to be supported by said bow-shaped members to enclose a portion of said flatbed vehicle when said bow-shaped members are in an expanded condition.

4. The collapsible cover kit of claim 3 wherein said bow-shaped members are U-shaped having a first generally horizontal portion adapted in use to extend transversely in spaced relation above said flatbed vehicle, said bow-shaped members having a pair of downwardly-extending vertical leg portions with free ends adapted in use to be secured to said guide tracks.

5. The collapsible cover kit of claim 1 wherein each of said longitudinal rails has an interlock means at either end adapted in use to couple with said interlock means of an adjacent rail.

6. The collapsible cover kit of claim 5 wherein said interlock means comprises a V-shaped groove at one end of said rail and a wedge-shaped projection at the opposing end of said rail whereby said wedge-shaped projection is adapted in use to be demountably coupled with said V-shaped groove to secure adjacent rails to each other.

7. The collapsible cover kit of claim 5 wherein said interlock means comprises at least one rectangular-shaped groove at one end of the rail and at least one rectangular-shaped projection at the opposing end of said rail whereby said rectangular-shaped projection is adapted in use to be demountably coupled with said rectangular-shaped groove to secure adjacent rails to each other.

8. The collapsible cover kit of claim 7, herein said interlock means comprises at least two spaced rectangular-shaped grooves at one end of said rail and at least two spaced rectangular-shaped projections at the opposing end of said rails whereby said rectangular-shaped projections art adapted in use to be demountably coupled with said rectangular-shaped grooves to secure adjacent rails to each other.

9. The collapsible cover kit of claim 5 wherein said interlock means includes lock means at either end of said rails adapted in use to secure adjacent coupled rails to each other.

10. The collapsible cover kit of claim 1 wherein said carrier means is a bracket having a base plate and two side plates extending downward from opposing side edges of said base, wheel means within said bracket adapted in use to roll along said rail, and means for attaching one end of said bow-shaped member to said bracket, 11. The collapsible cover kit of claim 10 wherein said carrier means further includes a cylindrical sleeve secured to the outer facing surface of base plate to receive the end of a bow-shaped member.

12. The collapsible cover kit of claim 1 further including power drive means for displacing said bow-shaped members between their expanded and collapsed positions.

13. A collapsible cover system adapted to be removably mounted to a plurality of spaced stake sockets secured between longitudinally extending rub rails and opposite sides of a flatbed vehicle, said system comprising:
a plurality of stakes having a lower end adapted to be securely disposed in said stake sockets and an upper end adapted to project upward from said flatbed vehicle;
a plurality of longitudinal rails fit together in end to end registering relationship to form two lengths of spaced guide tracks that project above and extend along the sides of said flatbed vehicle, each of said rails being attached to said upper end of one of said stake members for longitudinal sliding movement of said rail with respect to said stake without vertical disengagement of said rail from said stake;
a plurality of inverted bow-shaped members having free ends removably secured to said guide tracks; and
a plurality of carrier means for slidingly connecting each free end of said bow-shaped members to an associated guide track.

14. The collapsible cover system of claim 13 wherein said stakes each have a T-shaped stake member projecting outward from said upper end and each of said rails has a bottom section with a T-shaped slot formed therein, which slot extends the length of said rails and which slot receives said T-shaped stake member and enables longitudinal sliding movement of said rail with respect to said stake while preventing vertical disengagement of said rail from said stake.

15. The collapsible cover system of claim 13 further including a flexible cover member supported by said bow-shaped members to enclose a portion of said flatbed vehicle when said bow-shaped members are in an expanded condition.

16. The collapsible cover system of claim 13 wherein said bow-shaped members are U-shaped having a first generally horizontal portion adapted in use to extend transversely in spaced relation above said flatbed vehicle, said bow-shaped members having a pair of downwardly-extending vertical leg portions with free ends adapted in use to be secured to said guide tracks.

17. The collapsible cover system of claim 13 wherein each of said longitudinal rails has an interlock means at either end adapted in use to couple with said interlock means of an adjacent rail.

18. The collapsible cover system of claim 17 wherein said interlock means comprises a V-shaped groove at one end of said rail and a wedge-shaped projection at the opposing end of said rail whereby said wedge-shaped projection is demountably coupled with said V-shaped groove to secure adjacent rails to each other.

19. The collapsible cover system of claim 17 wherein said interlock means comprises at least one rectangular-shaped groove at one end of the rail and at least one rectangular-shaped projection at the opposing end of said rail whereby said rectangular-shaped projection is demountably coupled with said rectangular-shaped groove to secure adjacent rails to each other.

20. The collapsible cover system of claim 17 wherein said interlock means includes lock means at either end of said rails to secure adjacent coupled rails to each other.

21. The collapsible cover system of claim 13 wherein said carrier means is a bracket having a base plate and two side plates extending downward from opposing side edges of said base, wheel means within said bracket for rolling along said rail, and means for attaching one end of said bow-shaped member to said bracket.

22. The collapsible cover system of claim 13 further including power drive means for displacing said bow-shaped members between their expanded and collapsed positions.

* * * * *